United States Patent
Most et al.

(10) Patent No.: US 10,442,953 B2
(45) Date of Patent: Oct. 15, 2019

(54) AQUEOUS-BASED COATING COMPOSITION CONTAINING HYDROXY-TERMINATED POLYBUTADIENE

(71) Applicant: PPG Industries Ohio, Inc., Cleveland, OH (US)

(72) Inventors: Christopher L. Most, Wilder, KY (US); Robert McVay, Cincinnati, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 834 days.

(21) Appl. No.: 14/062,928

(22) Filed: Oct. 25, 2013

(65) Prior Publication Data

US 2014/0050869 A1    Feb. 20, 2014

Related U.S. Application Data

(63) Continuation-in-part of application No. 13/219,771, filed on Aug. 29, 2011, now abandoned, and a continuation-in-part of application No. 13/707,741, filed on Dec. 7, 2012, now Pat. No. 8,927,652, and a continuation-in-part of application No. 13/968,468, filed on Aug. 16, 2013, now Pat. No. 9,752,044.

(51) Int. Cl.
| | |
|---|---|
| *C09D 161/06* | (2006.01) |
| *C09D 133/10* | (2006.01) |
| *C08G 69/34* | (2006.01) |
| *C09D 5/02* | (2006.01) |
| *C09D 5/08* | (2006.01) |
| *C08G 8/32* | (2006.01) |

(52) U.S. Cl.
CPC ........... *C09D 161/06* (2013.01); *C08G 69/34* (2013.01); *C09D 5/02* (2013.01); *C09D 5/08* (2013.01); *C09D 133/10* (2013.01); *C08G 8/32* (2013.01); *C08L 2201/54* (2013.01); *C08L 2205/02* (2013.01); *Y10T 428/1352* (2015.01)

(58) Field of Classification Search
CPC ....... B32B 15/08; B32B 1/02; B32B 2439/66; B32B 2439/70; B65D 1/12; B65D 25/00; Y10T 428/1352
See application file for complete search history.

(56) References Cited

U.S. PATENT DOCUMENTS

| | | | |
|---|---|---|---|
| 2,091,633 A | 8/1937 | Frishkom | |
| 2,741,397 A | 4/1956 | Shotton | |
| 3,030,336 A | * 4/1962 | Greenspan | C08C 19/06 525/384 |
| 3,224,983 A | 12/1965 | D'Alelio | |
| 4,046,729 A | 9/1977 | Scriven et al. | |
| 4,164,587 A | 8/1979 | Borman | |
| 4,330,445 A | 5/1982 | Killeen et al. | |
| 4,391,640 A | 7/1983 | Okoahi et al. | |
| 4,623,680 A | 11/1986 | Azarnia et al. | |
| 4,808,658 A | 2/1989 | Walz et al. | |
| 4,963,602 A | 10/1990 | Patel | |
| 5,672,653 A | 9/1997 | Frisch et al. | |
| 5,688,891 A | 11/1997 | Hovestadt et al. | |
| 5,886,128 A | 3/1999 | West et al. | |
| 5,939,491 A | * 8/1999 | Wilt | C08G 77/388 525/100 |
| 5,994,469 A | 11/1999 | December et al. | |
| 7,122,605 B2 | 10/2006 | Ohrbom et al. | |
| 7,475,786 B2 | 1/2009 | McVay | |
| 7,592,047 B2 | 9/2009 | O'Brien et al. | |
| 8,142,868 B2 | 3/2012 | O'Brien et al. | |
| 2006/0228556 A1 | 10/2006 | Fenn | |
| 2007/0032606 A1 | 2/2007 | McVay | |
| 2008/0221263 A1* | 9/2008 | Kanagasabapathy | C09D 5/1618 524/588 |
| 2012/0171470 A1 | 7/2012 | Cavallin et al. | |
| 2012/0208967 A1 | 8/2012 | Birukov et al. | |

FOREIGN PATENT DOCUMENTS

| | | | | |
|---|---|---|---|---|
| GB | 1120738 A | * | 7/1968 | ........... C08G 59/027 |
| RU | 2 418 831 C2 | | 5/2011 | |
| SU | 59318 A1 | | 1/1941 | |

OTHER PUBLICATIONS

"Handbook of Elastomers Second Edition, Revised and Expanded", p. 143 (Year: 2001).*
Fernanda M. B. Coutinho et al., "Anionic Waterborne Polyurethane Dispersions, etc.", Journal of Applied Polymer Science, vol. 80, 566-572 (2001), John Wiley & Sons, Inc.
Espacenet English abstract of RU 2 418 831 C2.
English translation of SU 59318 A1.

* cited by examiner

Primary Examiner — James C Yager
(74) Attorney, Agent, or Firm — Diane R. Meyers; William J. Uhl

(57) ABSTRACT

An aqueous-based coating composition suitable as a container coating comprising:
(A) a resinous phase comprising
 (i) an at least partially neutralized acid functional polymer containing reactive functional groups,
 (ii) a phenolic compound and an aldehyde or the reaction product thereof,
 (iii) a hydroxy-terminated polybutadiene;
the resinous phase dispersed in
(B) aqueous medium.

12 Claims, No Drawings

AQUEOUS-BASED COATING COMPOSITION CONTAINING HYDROXY-TERMINATED POLYBUTADIENE

CROSS-REFERENCE TO RELATED APPLICATIONS

This application is a continuation-in-part of application Ser. No. 13/219,771, filed Aug. 29, 2011; application Ser. No. 13/707,741, filed Dec. 7, 2012 and application Ser. No. 13/968,468, filed Aug. 16, 2013.

FIELD OF THE INVENTION

The present invention relates to aqueous-based coating compositions suitable as container coatings, particularly for the interior surface of cans exposed to corrosive food stuffs.

BACKGROUND OF THE INVENTION

Coatings are typically applied to the interior of metal food and beverage containers to prevent the contents from contacting the metal surface of the container. Contact with certain foods, particularly acidic products, can cause the metal container to corrode. This corrosion results in contamination and deterioration in the appearance and taste of the food or beverage product.

Many of the coating compositions for food and beverage containers are based on epoxy resins that are the polyglycidyl ethers of bisphenol A. Bisphenol A in packaging coatings can be either bisphenol A itself (BPA) or derivatives thereof, such as diglycidyl ethers of bisphenol A (BADGE) and epoxy novolak resins. These coatings have excellent flexibility and adhesion to metal substrates. However, bisphenol A and derivatives thereof are problematic. Although the balance of scientific evidence available to date indicates that small trace amounts of BPA or BADGE that might be released from existing coatings does not pose health risks to humans, these compounds are nevertheless perceived by some as being harmful to human health. Consequently, there is a strong desire to eliminate these compounds from coatings for food and beverage containers.

Replacement coating compositions are typically based on hydroxyl group-containing polymers and aminoplast or phenolplast curing agents. Although these coatings have good adhesion, they lack the flexibility required to prevent corrosion that occurs when the coating undergoes microcracking due to severe deformation of the metal. In 2-piece food cans, for example, microcracking occurs in the headspace due to the double-seam process that affixes the can end after filling. This is commonly known as "pressure ridge" failure. Corrosive foodstuffs infiltrate the coating through the microcracks and corrode the metal surface causing corrosion, delamination of the coating and eventual perforation of the can which spoils the food. Because of the susceptibility of acrylic-based coatings to pressure-ridge failure, they are currently inferior to industry standard BPA-containing coatings in the packaging coatings industry because they cannot hold strongly corrosive foodstuffs such as tomato-based foodstuffs.

SUMMARY OF THE INVENTION

The present invention provides an aqueous-based coating composition suitable for coating the interior surface of a container in contact with food stuffs comprising:

(A) a resinous phase comprising
  (i) an at least partially neutralized acid functional polymer containing reactive functional groups,
  (ii) a phenolic compound and an aldehyde or the reaction product thereof,
  (iii) a hydroxy-terminated polybutadiene;
the resinous phase dispersed in
(B) aqueous medium.

DETAILED DESCRIPTION

As used herein, unless otherwise expressly specified, all numbers such as those expressing values, ranges, amounts or percentages may be read as if prefaced by the word "about", even if the term does not expressly appear. Moreover, it should be noted that plural terms and/or phrases encompass their singular equivalents and vice versa. For example, "a" polymer, "a" crosslinker, and any other component refers to one or more of these components.

When referring to any numerical range of values, such ranges are understood to include each and every number and/or fraction between the stated range minimum and maximum.

As employed herein, the term "polyol" or variations thereof refers broadly to a material having an average of two or more hydroxyl groups per molecule. The term "polycarboxylic acid" refers to the acids and functional derivatives thereof, including anhydride derivatives where they exist, and lower alkyl esters having 1-4 carbon atoms.

As used herein, the term "polymer" refers broadly to prepolymers, oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, ethacrylic acid, etc., and their $C_1$-$C_5$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The terms "acrylic polymer" or "(meth)acrylic polymer" refer to polymers prepared from one or more acrylic monomers.

As used herein, the molecular weights are determined by gel permeation chromatography using a polystyrene standard. Unless otherwise indicated, molecular weights are on a number average basis ($M_n$).

As indicated, one essential component of the compositions is an at least partially neutralized acid functional polymer containing reactive functional groups (i), Examples of such functional groups are hydroxyl that are reactive with the phenolic compound-formaldehyde reaction product and N-alkoxymethyl groups that are also reactive with the phenolic compound reaction product and with each other. The acid functional polymer can be a (meth)acrylic polymer.

Among the monomers used in preparing the (meth)acrylic polymer are ethylenically unsaturated carboxylic acids such as acrylic acid, methacrylic acid, itaconic acid, crotonic acid, and maleic acid.

The ethylenically unsaturated carboxylic acid is used in amounts of 20 to 36 percent, such as 22 to 33 percent by weight based on total weight of monomer used in preparing the (meth)acrylic polymer.

The monomer with the reactive functional group can be selected from hydroxyalkyl esters of (meth)acrylic acid, typically containing 2 to 4 carbon atoms in the hydroxyalkyl group and from N-alkoxymethyl groups derived from (meth) acrylamide containing from 1 to 4 carbon atoms in the N-alkoxy group.

Examples include hydroxyethyl (meth)acrylate and hydroxypropyl (meth)acrylate and monomers of the structure:

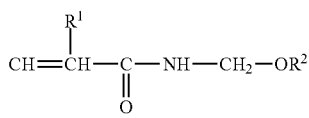

where $R^1$ is hydrogen or methyl and $R^2$ is lower alkyl containing from 1 to 4 carbons, Specific examples of such monomers are N-ethoxymethyl (meth)acrylamide and N-butoxymethyl (meth)acrylamide.

The monomers containing the reactive functional groups are typically present in amounts of 0.2 to 30, such as 5 to 40 percent by weight based on total weight of monomers used in preparing the (meth)acrylic polymer.

Other monomers are usually used in preparing the (meth) acrylic polymer. Examples include aromatic monomers such as styrene and vinyl toluene that are present in amounts of up to 10, such as 35 percent by weight based on total weight of monomers used in preparing the (meth)acrylic polymer; alkyl esters of (meth)acrylic acid containing from 1 to 8 carbon atoms in the alkyl group, such as methyl (meth) acrylate, butyl (meth)acrylate and 2-ethylhexyl (meth)acrylate that are present in amounts up to 15, such as 45 percent by weight based on total weight of monomers used in preparing the (meth)acrylic polymer.

The (meth)acrylic polymer is formed by free radical polymerization in the presence of a free radical initiator, Examples of initiators are azo compounds, such as, for example, alpha, alpha'-azobis(isobutyronitrile). Other useful initiators are tertiary-butyl perbenzoate, tertiary-butyl pivalate, isopropyl percarbonate, benzoyl peroxide and cumene hydroperoxide.

The (meth)acryiic polymer typically has a number average molecular weight of 3,000 to 20,000, as determined by gel permeation chromatography using a polystyrene standard.

The partially neutralized acid functional polymer containing functional groups (i) is usually present in the composition in amounts of 20 to 35, such as 25 to 30 percent by weight based on weight of resin solids in the coating composition. Amounts less than 20 percent by weight do not provide stable dispersions, whereas amounts greater than 35 percent by weight result in blistering of the film upon baking.

Component (ii) is a source of phenol and formaldehyde or the reaction product thereof. Examples of phenols are phenol, cresol, p-tert-butylphenol, p-octylphenol, p-nonylphenol and the source of formaldehyde can be paraformaldehyde.

The mole ratio of the formaldehyde-yielding substance to the phenol is suitably from 1.0 to 2.5:1, such as from 1.5 to 2.0:1.

The amount of component (ii) is usually 15 to 60 percent by weight, such as 20 to 35 percent by weight. If the amount of component (ii) exceeds 60 percent by weight, the coating becomes brittle and will fracture when the end, lid, is seamed on the can. Amounts less than 15 percent by weight result in poor corrosion resistance.

Component (iii) is a hydroxy-terminated polybutadiene. Hydroxy-terminated polybutadienes are commercially available. Examples include POLY BD R45HTLO, POLY BD R20LM, KRASOL LBH 2000, KRASOL LBH 2040, KRASOL LBH 3000, KRASOL LBH 5000, KRASOL LBH 10000, KRASOL LBH-P 2000, KRASOL LBH-P 3000 and KRASOL LBH-P 5000 products (all available from Cray Valley). Hydroxy-terminated polybutadienes typically have a number average molecular weight ("$M_n$") of from about 500 to about 10000, such as from about 1000 to about 5,000, and from about 2,000 to about 3,000.

The hydroxy-terminated polybutadienes are typically present in the composition in amounts of 2.5 to 10, such as 5 to 7.5 percent by weight based on weight of resin solids in the coating composition. Amounts less than 2.5 percent do not provide sufficient flexibility, whereas amounts greater than 10 percent by weight result in off flavor in packed foods or beverages.

The above-mentioned ingredients in the resinous phase can be mixed together and heated, typically at 80 to 130° F. (27-54° C.) for 60 to 180 minutes. The ingredients can be heated neat or in organic solvent and the mixture partially neutralized with amine and dispersed in aqueous medium. Alternatively, the ingredients can be dispersed first in aqueous medium and heated at the above temperatures and times.

The resin solids content of the aqueous-based coating composition is typically from 25 to 30 percent by weight.

The resulting product can then be combined with the acid functional polymer containing reactive functionality and the mixture dispersed in water with the aid of a neutralizing agent. Alternatively, the product can be mixed with an aqueous dispersion of component (i).

Besides (i), (ii) and (iii), other resinous ingredients can be included in the resinous phase. Examples include polysilicone resins and amine functional polyamides, all of which further enhance adhesion and corrosion resistance of the coating.

The silicone resins that are used in the practice of the invention are functional silicone resins, that is, they contain functional groups that are reactive with functional groups associated with (ii), Typically, these groups are active hydrogen groups such as hydroxyl. Also, the silicone resins are typically phenylated silicone resins containing a $C_6H_5$— Si≡bond. The phenyl group is beneficial in that it compatibilizes the silicone resin with the other resinous ingredients in the coating composition in that all of the resinous ingredients can be uniformly dissolved or dispersed in a diluent, that is, the silicone resin will not form a separate phase from the other resinous ingredients in the coating composition. The phenylated silicone resins typically used in the composition are alkyl-phenyl silsesquioxane resin as described in U.S. patent application Ser. No. 13/707,741, filed 7 Dec. 2012. When present, the polysilicone resin is present in amounts of up to 20 percent by weight based on weight of resin solids.

The amine-terminated polyamides are described in U.S. Pat. No. 7,475,786. When present, the amine-terminated polyamides are present in amounts of up to 20 percent by weight based on weight of resin solids.

The compositions of the invention are in the form of an aqueous dispersion in which the resinous phase is dispersed in aqueous medium. The aqueous medium of the dispersion may consist entirely of water in some cases but, more commonly, will consist of a mixture of water and water-soluble or water-miscible organic solvents. Suitable organic solvents are the ether type alcohols, such as ethylene glycol monobutyl ether (butyl Cellosolve), ethylene glycol monoethyl ether (ethyl Cellosolve) and the like, and lower alkanols having 2 to 4 carbon atoms such as ethanol, propanol, isopropanol, butanol, and the like. Minor proportions of hydrocarbon solvents such as xylene, toluene, and the like may also be present in the aqueous medium. The aqueous medium may contain from about 60 percent to about 100 percent by weight of water and from about 0 percent to about 40 percent by weight of organic solvent. The percentage by weight is based on total weight of the aqueous medium.

To disperse the resinous phase in the aqueous medium, the (meth)acrylic polymer is at least partially neutralized with a base such as an amine. Examples of amines include ammonia, monoethanolamine and diethanolamine. Typically, the amine will neutralize at least 25 percent, such as at least 50 percent of the acid equivalents in the (meth)acrylic polymer.

The other resinous ingredient can then be combined with the (meth)acrylic polymer salt and the mixture dispersed in the aqueous medium. The resin solids content of the aqueous dispersion is typically from 25 to 30, such as 26 to 28 percent by weight based on total weight of the aqueous dispersion.

In certain embodiments, the compositions used in the practice of the invention are substantially free, may be essentially free and may be completely free of bisphenol A and derivatives or residues thereof, including bisphenol A ("BPA") and bisphenol A diglycidyl ether ("BADGE"). Such compositions are sometimes referred to as "BPA non intent" because BPA, including derivatives or residues thereof, are not intentionally added but may be present in trace amounts because of unavoidable contamination from the environment. The compositions can also be substantially free and may be essentially free and may be completely free of bisphenol F and derivatives or residues thereof, including bisphenol F and bisphenol F diglycidyl ether ("BPFG"). The term "substantially free" as used in this context means the compositions contain less than 1000 parts per million (ppm), "essentially free" means less than 100 ppm and "completely free" means less than 20 parts per billion (ppb) of any of the above-mentioned compounds, derivatives or residues thereof.

The coating compositions of the present invention can be applied to containers of all sorts and are particularly well adapted for use on food and beverage cans (e.g., two-piece cans, three-piece cans, etc.).

The compositions can be applied to the food or beverage container by any means known in the art such as roll coating, spraying and electrocoating. It will be appreciated that for two-piece food cans, the coating will typically be sprayed after the can is made. For three-piece food cans, a flat sheet will typically be roll coated with one or more of the present compositions first and then the can will be formed. As noted above, the percent solids of the composition can be adjusted based upon the means of application. The coating can be applied to a dry film weight of 24 mgs/4 in$^2$ to 12 mgs/4 in$^2$, such as 20 mgs/4 in$^2$ to 14 mgs/4 in$^2$.

After application, the coating is then cured. Cure is effected by methods standard in the art. For coil coating, this is typically a short dwell time (i.e., 9 seconds to 2 minutes) at high heat (i.e., 485° F. (252° C.) peak metal temperature); coated metal sheets typically cure longer (i.e., 10 minutes) but at lower temperatures (i.e., 400° F. (204° C.) peak metal temperature), For spray applied coatings on two-piece cans, the cure can be from 5 to 8 minutes, with a 90-second bake at a peak metal temperature of 415° F. (213° C.) to 425° F. (218° C.).

Any material used for the formation of food cans can be treated according to the present methods. Particularly suitable substrates include tin-plated steel, tin-free steel and black-plated steel.

The coatings of the present invention can be applied directly to the steel, without any pretreatment or adhesive aid being added to the metal first. In addition, no coatings need to be applied over top of the coatings used in the present methods.

The compositions of the present invention perform as desired both in the areas of adhesion and flexibility.

EXAMPLES

The following examples are offered to aid in understanding of the present invention and are not to be construed as limiting the scope thereof. Unless otherwise indicated, all parts and percentages are by weight.

Example A

A (meth)acrylic polymer was prepared by free radical polymerization in 2-butoxyethanol from the following monomer mixture: 20 percent by weight methacrylic acid, 25 percent by weight styrene, 50 percent by weight butyl acrylate and 5 percent by weight N-butoxymethylol acrylamide; the percentages by weight being based on total weight of monomers. The resulting polymer had an $M_n$ of 3495 and a theoretical solids content of 52 percent by weight in 2-butoxyethanol.

Example B

An aqueous dispersion of a (meth)acrylic polymer was prepared by first preparing a (meth)acrylic polymer by free radical polymerization in n-butanol from the following monomer mixture: 30 percent by weight methacrylic acid, 25 percent by weight styrene, 43 percent by weight butyl acrylate and 2 percent by weight N butoxymethylol acrylamide; the percentages by weight being based on total weight of monomers. The resulting polymer had an $M_n$ of 10,600 and a theoretical solids content of 52 percent by weight in butanol. The polymer was partially neutralized (30 percent of the total theoretical neutralization) with dimethylethanolamine and dispersed in water at a theoretical solids content of 43.5 percent by weight.

Example 1

An aqueous coating composition was obtained by mixing together the following ingredients using a cowles disperser heating to obtain a stable dispersion.

| Ingredient | Parts by Weight |
| --- | --- |
| Acrylic polymer of Example A | 181.34 |
| Phenolic resin[1] | 651.26 |
| Polyamide[2] | 95 |
| Silicone resin[3] | 81 |
| Linseed oil reacted with phenol and formaldehyde[4] | 99 |
| Hydroxy-terminated polybutadiene | 56 |
| Acrylic polymer dispersion of Example B | 600.41 |
| Deionized water | 763 |
| Phenolic resin[5] | 91 |
| Deionized water | 268 |

-continued

| Ingredient | Parts by Weight |
|---|---|
| Oleic acid | 20 |
| Deionized water | 865 |

[1] Cresol-formaldehyde resin from Cytec as PR516.
[2] Amine-terminated polyamide from Momentive as EPIKURE 3115 (80% solids in butanol).
[3] Available from Dow Chemical as XIAMETER RSN255 (70% solids in butanol).
[4] Condensate of 42 percent by weight Linseed Oil, 43 percent by weight cresol and 15 percent by weight of formaldehyde.
[5] t-butyl phenol-formaldehyde resin from Durez as 29-401.

Example 2

An aqueous coating composition similar to Example 1 was prepared but without the Linseed Oil reaction product. The composition was obtained by mixing together the following ingredients and heating to obtain a stable dispersion.

| Ingredient | Parts by Weight |
|---|---|
| Acrylic polymer of Example A | 127.10 |
| Cresol-formaldehyde phenolic resin of Example 1 | 594.95 |
| Polyamide of Example 1 | 95 |
| Acrylic polymer dispersion of Example B | 600.41 |
| Deionized water | 763 |
| t-Butyl phenol-formaldehyde phenolic resin of Example 1 | 236 |
| Deionized water | 268 |
| Oleic acid | 20 |
| Deionized water | 829.55 |

Example 3 (Comparative)

An aqueous coating composition similar to Example 1 was prepared but without the hydroxy-terminated polybutadiene. The composition was obtained by mixing together the following ingredients and heating to obtain a stable dispersion.

| Ingredient | Parts by Weight |
|---|---|
| Acrylic polymer of Example A | 181.34 |
| Cresol-formaldehyde phenolic resin of Example 1 | 651.26 |
| Polyamide of Example 1 | 95 |
| Linseed oil reacted with phenol and formaldehyde of Example 1 | 99 |
| Acrylic polymer dispersion of Example B | 600.41 |
| Deionized water | 763 |
| t-Butyl phenol-formaldehyde phenolic resin of Example 1 | 91 |
| Deionized water | 268 |
| Oleic acid | 20 |
| Deionized water | 865 |

The coating compositions of Examples 1-3 were spray applied to the interior surface of 211×400 electro tin plated steel 2-piece D&I cans at a film weight of 220 mg±10 mg and the can ends at a coating weight of 16-18 mg/4 in$^2$. The coatings were cured by heating the can in a 4-zone IBO oven to achieve 400° F. (204° C.) on the dome (bottom of the can) for 90 seconds for 5 minutes total bake. The can ends were seamed onto the can body containing chicken rice soup filled to ½ inch (1.27 cm) head space. The can was steam processed for 90 minutes at 121° C. and stored at 120° F. (49° C.) for two weeks. The cans were removed from storage, cooled and cut open with four vertical cuts from top to bottom and flattened to resemble a cross and the interior coated surfaces of the can evaluated for adhesion, corrosion and flexibility, all of which were measured on a scale of 0 to 10.

Adhesion testing is performed according to ASTM D-3359, Test Method B, using SCOTCH 610 tape. A reading of 10 indicates no adhesion failure, a reading of 9 indicates 90 percent of the coating remained adhered, and a reading of 0 indicates complete adhesion failure. For corrosion protection, a "0" indicates the coating is completely corroded, observed by bubbling or blistering of the film in all areas. A "10" indicates no evidence of corrosion. Evidence of corrosion was evaluated in the head space area that is the most difficult part of the 2-piece can to get corrosion resistance because it contains the least amount of tin plating due to the drawing process. Flexibility is determined by coating loss following can deformation on the circumference of the dome. A reading of 10 indicates no coating loss whereas a reading of 0 indicates complete coating loss.

The results of the testing on three cans for each example are reported in the Table below.

TABLE

Adhesion, Corrosion and Flexibility Testing Results

| Coating Example | Adhesion | Corrosion | Flexibility |
|---|---|---|---|
| 1 | 10 | 9.1 | 10 |
| 1 | 10 | 9.1 | 10 |
| 1 | 10 | 9.8 | 10 |
| 2 | 10 | 5.2 | 10 |
| 2 | 10 | 5.6 | 10 |
| 2 | 10 | 7.2 | 10 |
| 3 | 10 | 8.9 | 8.9 |
| 3 | 10 | 9.8 | 8.9 |
| 3 | 10 | 8.9 | 8.5 |

What is claimed is:

1. An aqueous-based coating composition comprising:
    (A) a resinous phase of
        (i) 20 to 35 percent by weight of an at least partially neutralized acid functional polymer containing reactive functional groups,
        (ii) 40 to 60 percent by weight of a phenolic compound and an aldehyde or the reaction product thereof,
        (iii) 2.5 to 10 percent by weight of a hydroxy-terminated polybutadiene;
    the resinous phase dispersed in
    (B) aqueous medium.

2. The aqueous-based coating composition of claim 1 in which the phenolic compound is selected from the group consisting of phenol and an alkylated phenol.

3. The aqueous-based coating composition of claim 1 in which the aldehyde is formaldehyde.

4. The aqueous-based coating composition of claim 1 in which the acid functional polymer is a copolymer of (meth) acrylic monomers.

5. The aqueous-based coating composition of claim 1 in which the acid functional polymer comprises carboxylic acid groups.

6. The aqueous-based coating composition of claim 1 in which the reactive functional groups are selected from hydroxyl and N-alkoxymethyl groups.

7. The aqueous-based coating composition of claim 1 containing an amine-terminated polyamide in the resinous phase.

8. The aqueous-based coating composition of claim 1 containing an alkyl-phenyl silsesquioxane resin in the resinous phase.

9. A coated article comprising:
   (A) a substrate and
   (B) a coating deposited on at least a portion of the substrate from the composition of claim 1.

10. The coated article of claim 9 in which the substrate is a container.

11. The coated article of claim 10 in which the container is a food or beverage container.

12. The coated article of claim 11 in which the coating is on the interior surface of the container.

\* \* \* \* \*